R. Hale.
Sheep Rack.
N°41,216. Patented Jan. 12, 1864.

Witnesses
J. W. Coombs
G. W. Reed

Inventor
Robert Hale
per Munn & Co.
Attorneys

UNITED STATES PATENT OFFICE.

ROBERT HALE, OF FITCHBURG, MASSACHUSETTS.

IMPROVEMENT IN SHEEP-RACKS.

Specification forming part of Letters Patent No. 41,216, dated January 12, 1864.

*To all whom it may concern:*

Be it known that I, ROBERT HALE, of Fitchburg, in the county of Worcester and State of Massachusetts, have invented a new and useful Improvement in Sheep-Racks; and I do hereby declare that the following is a full, clear, and exact description of the same, reference being had to the accompanying drawings, making a part of this specification, in which—

Figure 1:
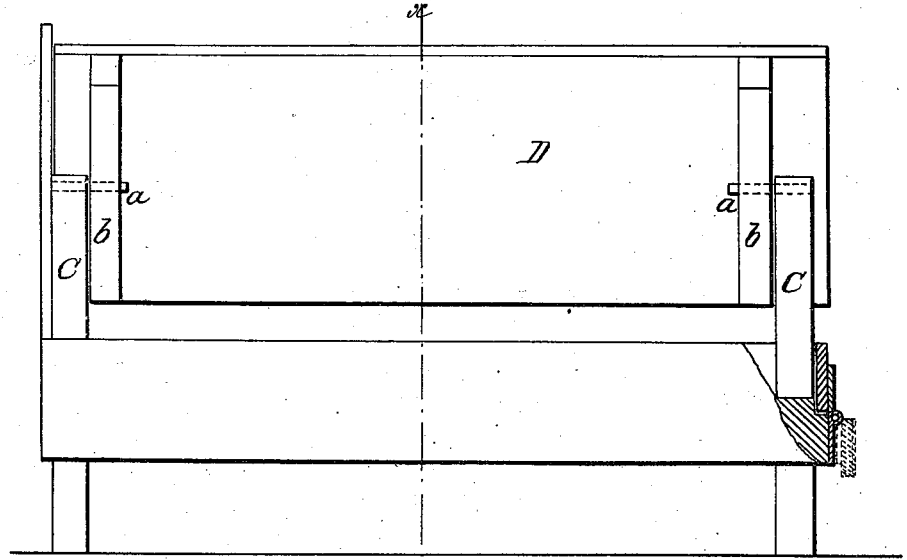
Figure 2:
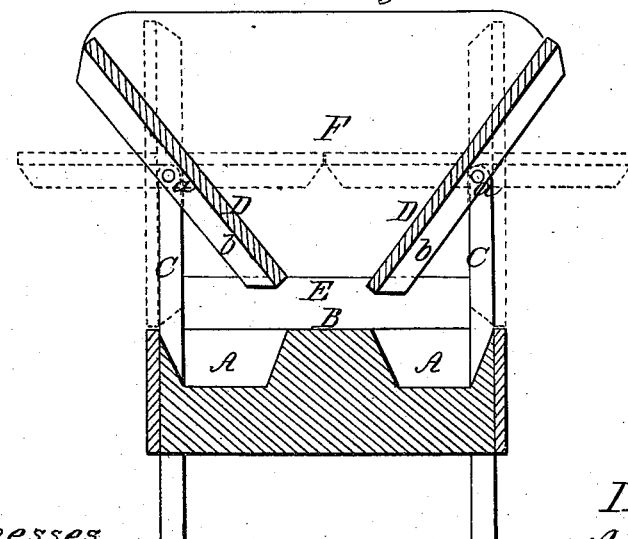

Figure 1 is a side view of my invention; Fig. 2, a transverse vertical section of the same, taken in the line $x\ x$, Fig. 1.

Similar letters of reference indicate corresponding parts in the two figures.

This invention relates to an improvement in a sheep-rack for which Letters Patent were granted to James P. Eaton, bearing date March 17, 1863.

The invention consists in a peculiar arrangement in what are termed the "feeders," whereby the same, when adjusted to admit of the cribs or troughs being cleaned out or supplied with feed, will prevent the sheep having access to the cribs or troughs, as hereinafter set forth.

To enable those skilled in the art to fully understand and construct my invention, I will proceed to describe it.

A A represent two cribs or troughs which are parallel with each other, one at each side of the rack, and have an elevated walk, E, between them. These parts may be constructed in the same way as described in the Letters Patent granted James P. Eaton, previously referred to.

C represents uprights at the sides of the rack, two at each side, and to these uprights the feeders D D are secured by pivots $a$. The feeders D are constructed of boards or plank having battens $b$ secured to them at one side, and the pivots $a$ pass through the centers of these battens, and are fitted loosely in the uprights C, so that they may turn freely therein. The feeders D are of such a width that when turned in one direction (inward) their lower edges will rest or bear in notches in a cleat or cross-piece, E, at one end of the rack, and be held in an inclined position, as shown in tint in Fig. 2, the lower edges of the feeders being a short distance above the elevated walk B, so as to admit of a space, $b$, to form a communication between the two cribs or troughs A A and the chamber or hopper F, formed by the two feeders D D.

When hay or other similar fodder is to be fed to the sheep, it is placed in the hopper or chamber F, the sheep drawing it through the space $b$ as they consume it. Grain, roots, &c., are placed directly into the cribs or troughs A A.

When the cribs or troughs require to be cleaned, the feeders D are turned in a vertical position, as shown in red in Fig. 2, their lower edges being in contact with the upper edges of the outer sides of the cribs or troughs. When the feeders are in this position, they cut off all communication to the rack, so that the sheep can have no access to it, and the operator can cleanse the cribs or troughs without any difficulty whatever, and can also place grain, roots, or ground feed in the cribs or troughs without being troubled with the sheep, which would otherwise rush to the rack and the strongest be enabled to obtain more than their share.

The feeders D D may, by being adjusted in a horizontal position, form a table, as shown by the red dotted lines in Fig. 2, the feeders being retained in this position by any proper fastening. This table will be convenient for shearing and other purposes.

The advantages of my improvement consist, first, in economy in manufacturing the same, no butts or hinges being required as in the original patented device, and no mortises or tenons; second, the keeping of the sheep from the rack while the latter is being cleaned or supplied with feed, and the easy conversion of the device into a table when the latter is required.

Having thus described my invention, what I claim as new, and desire to secure by Letters Patent, is—

The employment or use in a sheep-rack of pivoted feeders, arranged in such a manner as to form a hopper when the rack is in use, and admit of being adjusted so as to prevent the animals having access to the rack while the latter is being cleaned or while it is being supplied with feed, substantially as herein set forth.

ROBERT HALE.

Witnesses:
THOS. S. J. DOUGLAS,
D. ROBERTSON.